United States Patent [19]

Fletcher et al.

[11] 3,882,719

[45] May 13, 1975

[54] DEVICE FOR USE IN LOADING TENSION MEMBERS

[76] Inventors: James C. Fletcher, Administrator of the National Aeronautics and Space Administration with respect to an invention by; Walter T. Appleberry, Long Beach, Calif.

[22] Filed: May 10, 1973

[21] Appl. No.: 359,156

[52] U.S. Cl. .................................. 73/143; 73/143
[51] Int. Cl. .............................................. G01l 5/04
[58] Field of Search .......................... 73/143, 88 R

[56] References Cited
UNITED STATES PATENTS

| | | | |
|---|---|---|---|
| 3,696,667 | 10/1972 | Foster et al. | 73/143 |
| 3,791,210 | 2/1974 | Taylor | 73/143 |

*Primary Examiner*—Jerry W. Myracle
*Attorney, Agent, or Firm*—Wayland H. Riggins; L. D. Wofford, Jr.; John R. Manning

[57] ABSTRACT

A device for use in loading tension members with preselected stress. The indicator is characterized by an elongated elastic body having extended from the opposite ends thereof threaded shanks adapted to be coupled with selected tension members, a pair of external shoulders, one of which is axially displaceable relative to the other, and a rigid tubular sleeve interposed between said shoulders so that as tension is applied to the elastic body for imparting strain thereto, the movable shoulder can be advanced into abutting engagement with the sleeve, whereby the sleeve is placed in compression once the tensile forces are removed from the shanks. A reapplication of tensile forces equal to the initially applied tensile forces removes the sleeve from compression, whereby the sleeve is freed for rotation for thus indicating the magnitude of the applied tensile forces.

1 Claim, 4 Drawing Figures

PATENTED MAY 13 1975 3,882,719

DEVICE FOR USE IN LOADING TENSION MEMBERS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

The invention relates to devices for use in loading tension members, and more particularly to an indicator having particular utility as a turnbuckle for applying predetermined loads on the straps, cables and the like.

The prior art, of course, is replete with turnbuckles, tie rods, tie bolts, and the like. Furthermore, various devices heretofore have been employed in measuring elongation of tie rods, tie bolts and the like in order to determine the level of applied tensile force and resulting stress imparted thereto. Such devices are typified by the tie bolt described and claimed in U.S. Pat. No. 3,242,725, patented Mar. 29, 1966.

Electrical strain gages generally are accepted as the most practical devices for accurately determining levels of tensile stress applied to bands, straps, turnbuckles, and the like. As can readily be appreciated by those familiar with fabrication techniques commonly employed in constructing various types of vehicles such as spacecraft, aircraft, boats, and the like, it often is difficult if not totally impossible to accurately determine the levels of tensile forces applied to a tension member once it has been installed in an operative disposition. Such inability to determine the levels of applied force and/or resulting stress often results from a lack of adequate space. Additionally, competition for available time often prohibits a use of suitable strain gages having a sufficient accuracy.

Consequently, there currently exists a need for a simple, practical, and economic device which can readily be employed in loading tension members, such as bands, straps, cables, and the like, with precisely determined tensile stress.

Therefore, it is the general purpose of the instant invention to provide a device which is of an economic and simple configuration and which can readily be employed in loading tension members such as bands, straps, cables, and the like, with precisely determined tensile stress.

OBJECTS AND SUMMARY OF THE INVENTION

It is therefore an object of the instant invention to provide a device for use in loading tension members with precisely determined stress.

It is another object to provide a simple and economic device for use in loading tension members such as bands, straps, cables, and the like, with tensile stress of precisely determined magnitudes.

It is another object to provide an improved device suitable for use as a turnbuckle and the like for applying tensile loads to tension members installed aboard aircraft, spacecraft, boats, antennas, oil drilling rigs, and the like.

These and other objects and advantages are achieved through the use of an elongated elastic body including coupling shanks affixed to the opposite ends thereof, whereby the body is adapted to be coupled adjacent tensile members, an annular shoulder affixed to the body, a tubular sleeve telescopically related to the body in an abutting engagement with the shoulder, and a nut seated on an externally threaded portion of the body, in spaced relation with the annular shoulder, so that the nut can be advanced into an abutting engagement with one end of the sleeve as the body is stressed and thereafter employed for maintaining a stressed condition for the body once tensile forces are removed, as will hereinafter become more readily apparent by reference to the following description and claims in light of the accompanying drawings.

DESCRIPTION OF THE PREFERRED EMBODIMENT

Figure 1:
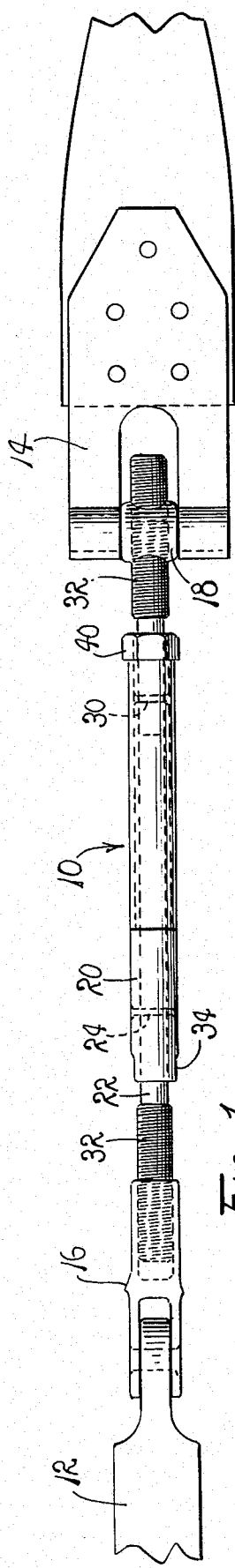
FIG. 1 is a top plan view of a device which embodies the principles of the instant invention, depicting the device in a mated relationship with a tie-strap.
Figure 2:
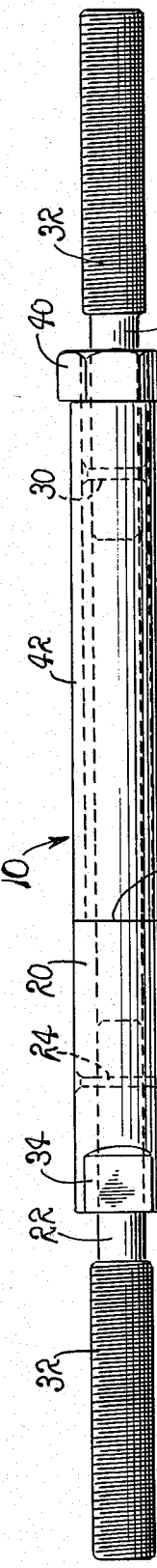
FIG. 2 is a top plan view, on somewhat of an enlarged scale, of the device shown in FIG. 1.

Referring now to the drawings wherein like reference characters designate like or corresponding parts throughout the several views, there is shown in FIG. 1 a device 10 which embodies the principles of the instant invention.

As illustrated, the device 10 is interposed between an anchor 12 and a tie-strap 14. It is to be understood that the device 10 is particularly suited for use in coupling tension members of a wide variety including bands, straps, cables and the like. However, the device 10 also can be employed as a strain gage, scale and similar devices. As illustrated, the anchor 12 is provided with a barrel 16 having internal screw-threads, in a manner well understood by those familiar with turnbuckles and similar devices. The tie-strap 14, as shown, includes a swivel-nut 18, also provided with internal screw-threads. Since the tie-strap 14 and the anchor 12 are shown for illustrative purposes and form no specific part of the instant invention, a detailed description thereof is omitted in the interest of brevity.

The device 10 is provided with an elongated body 20 which, for the sake of simplicity of description, is designated an elastic body. It is to be understood, however, that the body 20 preferably is formed of a metallic material which when subjected to tensile stress of a predetermined magnitude elongates within its elastic limits. Therefore, it is to be understood that the body 20 is fabricated from a suitable material which can be strained under the influence of tensile stress applied thereto.

Figure 3:
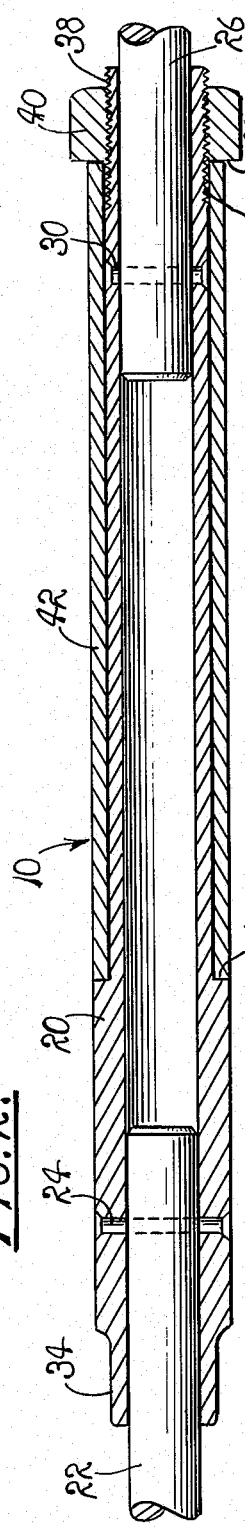
FIG. 3 is a cross-sectional view, on yet a further enlarged scale, illustrating the relationship of the component parts of the device.

As best illustrated in FIG. 3, the body 20 is of a tubular configuration and receives within one end thereof, in telescoping fashion, a shank 22. The shank 22 is pinned to the body 20 by a suitable coupling pin 24. Similarly, a shank 26 is received in telescoping fashion within the opposite end of the body 20 and is pinned thereto by a coupling pin 30. Accordingly, it is to be understood that the shanks 22 and 26 are fixed to the body 20. These shanks are oppositely threaded with threads 32.

The device 10 preferably is, in operation, interposed in an interconnecting relationship with the anchor 12 and the tie-strap 14. Hence, the distal ends of the shanks 22 and 26 are provided with oppositely directed screw-threads so that the shanks 22 and 26 can simultaneously be advanced into the barrel 16 and the swivel-nut 18, as torque is applied to the body 20. Thus, it should readily be apparent that the device 10 is suited to be employed in a manner consistent with that of the ordinary turnbuckle, as well as a device for use in applying tensile stress. Moreover, since the device 10 is employable as a turnbuckle, suitable flaps 34 are provided on the external surface of the body 20 for facilitating application of a wrench to be employed in torquing the body 20 for threading shank 22 into the barrel 16 and the shank 26 into the swivel-nut 18.

As best shown in FIG. 3, the body 20 is machined to provide it with two external surface portions of different diameters which intersect at an annular shoulder 36, near one end of the body 20 facing the opposite end of the body. Near the opposite end of the body 20 there is provided a surface portion 37 having external screw-threads 38 extended therealong for receiving thereon an internally screw-threaded nut 40. The nut 40 includes an annular face 41 and is provided with suitable threads for accommodating a threading movement thereof along the threaded portion 37 of the body 20, in response to applied torque.

Between the face 41 of the nut 40 and the face of the shoulders 36, not designated, there is disposed a tubular sleeve 42. The sleeve 42 is telescopically received by the body 20, externally thereof, with its opposite ends disposed in juxtaposition with the shoulder 36 and nut 40 so as to accommodate an abutting engagement thereof with the shoulder 36 and the face 41 of the nut 40. The sleeve 42, in effect, is acted upon by the shoulder and nut and serves as a spacer unit acting in compression for maintaining a stress condition on the body 20 as the body contracts upon removal of tensile forces. Thus, the body 20 may be prestressed.

Hence, it is to be understood that the nut 40 is, in practice, manipulated so that it is advanced along the threaded surface portion 37 of the body 20 into an abutting engagement with the sleeve 42, when the body 20 is strained or in an elongated configuration. It is also to be understood that the sleeve 42 is supported for free rotation relative to the body 20, so long as the nut 40 and the shoulder 36 do not act to place the sleeve in compression, but is restrained by the nut and the shoulder as the body 20 contracts to place the sleeve in compression.

OPERATION

It is believed that in view of the foregoing description, the operation of the device will be readily understood and it will be briefly reviewed at this point.

With the device 10 assembled in the manner hereinbefore described, it is to be understood that, initially, it is prestressed by being interposed between adjacent tension members of a type normally found in conventional tension-test machines. While other devices can be employed, it is to be understood that prestressing of the device preferably is achieved by applying to the shanks 22 and 26 an initial tensile force of a selected magnitude, established by a tension-test machine.

Figure 4:
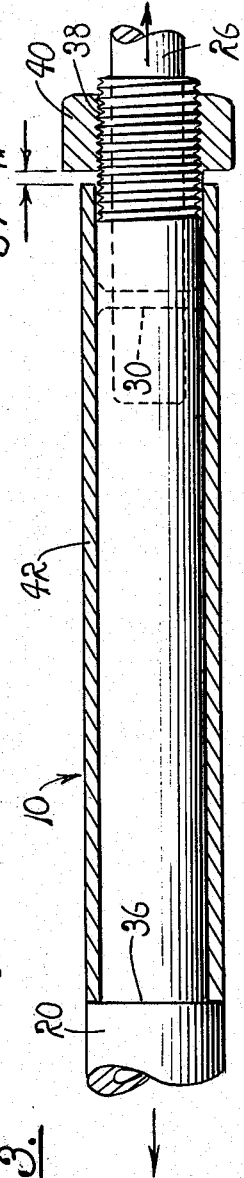
FIG. 4 is a fragmented, cross-sectional view depicting positions assumed by component parts when a tensile force is applied to the device.

Sufficient force thus applied to the device causes the body 20 to be strained or elongate within its elastic limits. As shown in FIG. 4, when the body is strained by oppositely applied tensile forces, the nut 40 assumes a spaced relationship with the adjacent end of the sleeve 42. A simple manipulation of the nut 40 is relied upon for advancing the nut into contiguous engagement with the adjacent end of the tubular body. When so positioned, the strained condition of the body 20 is maintained, as a consequence of the sleeve 42 being placed in compression between the shoulder 36 and the face of the nut 40. This state of compression is maintained after the device 10 is removed from the tension-test machine, and in the absence of tensile forces applied to the shanks 22 and 26. Thus, a prestress condition is imposed on the device 10.

The device is thus prepared for use as a weighing scale, strain gage or similar device. When prestressed, the device 10 is interposed between an anchor 12 and a tie-strap 14, simply by inserting the shanks 22 and 26 into the barrel 16 and the swivel-nut 18, respectively. Since the threads 32 provided along the shanks are oppositely directed, the device 10 is employed in a manner consistent with that of an ordinary turnbuckle. Accordingly, a wrench is applied to the flats 34 and torque is applied to the device 10 for threading the shanks 22 and 26 into the barrel 16 and the swivel-nut 18.

Consequently, a second tensile force thus is applied to the device 10 for again stressing the body 20. Once a sufficient second force is applied, the body 20 again will elongate for removing the sleeve 42 from compression, whereupon the sleeve is rendered free to rotate relative to the body 20. This condition of the sleeve can readily be detected tactily and serves to indicate that the second force thus applied is of a magnitude equal to the force initially applied thereto in the tension-test machine. Hence, no further operation or measurement of the applied force is required in accurately tensioning the strap 14, since the thus applied force is equal to the force initially applied in the tension-test machine.

In view of the foregoing, it is to be understood that the device of the instant invention provides a practical solution to the perplexing problem of providing a practical, economic, readily employable device for use in accurately applying tensile loads to members oriented in an operative environment.

Although the invention has been herein shown and described in what is conceived to be the most practical and preferred embodiment, it is recognized that departures may be made therefrom within the scope of the invention, which is not to be limited to the illustrative details disclosed.

What is claimed is:

1. A prestressed device for use in loading tension members comprising:
    an elongated elastic body having at least a portion thereof of circular cross section and having a pair of shanks extended from the opposite ends thereof for coupling said body with means adapted to apply tensile force to said body;
    means defining on the external surface of said portion of said elastic body an annular shoulder;
    means defining in space relation with said annular shoulder a screw-thread extended along the surface of said elastic body;
    an internally screw-threaded nut seated in mated relationship with said screw-thread;

a rigid sleeve telescopically received on said circular portion of said elastic body and having one end thereof disposed in abutting engagement with said annular shoulder and the opposite end thereof disposed in juxtaposition with said nut so that as a tensile force is applied to said shanks, the elastic body is caused to elongate, whereby a repositioning of the nut into abutting engagement with said sleeve is facilitated for supporting the elastic body in a prestressed condition, subsequent to removal of applied tensile force;

said sleeve being circular in cross section and having an internal diameter substantially equal to the external diameter of said circular portion of said elastic body whereby said sleeve fits snugly with said portion of said body;

said sleeve being freely rotatable relative to said body when said nut is not pressing against said opposite end of said sleeve thereby providing a tactily detectable indication as to when a tensile force exceeding such prestress force is reapplied to said body.

* * * * *